US007253380B2

(12) United States Patent
Miller

(10) Patent No.: US 7,253,380 B2
(45) Date of Patent: Aug. 7, 2007

(54) INDUCTION HEATING OF RAIL WELDS

(75) Inventor: Richard Miller, Warren, OH (US)

(73) Assignee: Holland LP, Crete, IL (US)

( * ) Notice: Subject to any disclaimer, the term of this patent is extended or adjusted under 35 U.S.C. 154(b) by 11 days.

(21) Appl. No.: 10/296,635

(22) PCT Filed: Jun. 4, 2001

(86) PCT No.: PCT/US01/18201

§ 371 (c)(1),
(2), (4) Date: Sep. 28, 2004

(87) PCT Pub. No.: WO01/93641

PCT Pub. Date: Dec. 6, 2001

(65) Prior Publication Data

US 2005/0173419 A1    Aug. 11, 2005

Related U.S. Application Data

(60) Provisional application No. 60/209,040, filed on Jun. 2, 2000.

(51) Int. Cl.
*H05B 6/08* (2006.01)
*H05B 6/10* (2006.01)
*B23K 13/01* (2006.01)

(52) U.S. Cl. ............... 219/617; 219/610; 219/635; 219/662; 219/667; 219/672; 219/676; 266/129; 148/569

(58) Field of Classification Search ............... 219/617, 219/610, 635, 662, 676–677, 667, 603, 608, 219/615, 616, 637, 639, 670–672, 53–55; 266/129; 148/567, 569
See application file for complete search history.

(56) References Cited

U.S. PATENT DOCUMENTS

| 4,300,031 A | * | 11/1981 | Reboux et al. ............. 219/617 |
| 4,327,265 A | * | 4/1982 | Edinger et al. ............. 219/605 |
| 4,355,222 A | * | 10/1982 | Geithman et al. .......... 219/633 |
| 4,717,801 A | * | 1/1988 | Brolin et al. ............... 219/617 |
| 4,734,552 A | * | 3/1988 | Brolin ........................ 219/617 |
| 4,845,332 A | * | 7/1989 | Jancosek et al. ........... 219/645 |
| 5,773,779 A | * | 6/1998 | Morlock ...................... 219/54 |
| 5,877,468 A | * | 3/1999 | Morlock ...................... 219/54 |

FOREIGN PATENT DOCUMENTS

WO      WO 99/31322    * 6/1999

* cited by examiner

Primary Examiner—Philip H. Leung
(74) Attorney, Agent, or Firm—Barnes & Thornburg LLP

(57) ABSTRACT

An apparatus (10) and method for preheating welds uses a centered induction plate (12) having preferably a plurality of induction coils (30, 32) to impart the generation of heat in the materials to be welded (14), being interactively controlled by at least a temperature sensor (90, 92) and power supply control loop (16) so that even preheating can be obtained for a selected length of time given the parameters of the weld desired.

31 Claims, 4 Drawing Sheets

_US 7,253,380 B2_

INDUCTION HEATING OF RAIL WELDS

CLAIM OF PRIORITY

Priority is claimed based upon Provisional Patent Application Ser. No. 60/209,040, filed Jun. 2, 2000, which is incorporated by reference as if fully set forth herein.

FIELD OF THE INVENTION

Some welding techniques require precise consistent and controlled heating, which is difficult or impossible to obtain with torches, gas burners or other electric devices. Instead, this is achievable through the use of induction heating wherein a plate or other locating and holding device is placed in a gap between work pieces to be welded, the plate containing an array of induction heating elements which, when energized, produce shaped, varying electromagnetic fields which link with and induce a voltage in the work pieces which in turn results in eddy current flows and subsequent power losses, as well as hysteresis losses, so that the workpiece temperature is raised to a desired, uniform level prior to welding.

BACKGROUND OF THE INVENTION

Summary of Invention

The preferred embodiment is adapted to use in welding railroad rails, however, other difficult to weld work pieces could be advantageously preheated with the invention. The descriptions herein of rail welds should be considered with this more expansive use in mind.

Induction type heat allows for precise heating at ideal locations and can be used to control heat gradients. This control is possible though use of a feedback system, controller, coil arrangement and a positioning mechanism. This eliminates the human element, resulting in an automated high quality weld preheat method.

The use of an automated electrically powered and computer controlled induction heating system using the induction heating coils and heating plate with sensitive temperature control and feedback interfaced within the power supply enables higher quality and more consistent welds of difficult to weld pieces such as railroad rails and similar high strength and complex shaped generally ferric items. One advantage in this regard is the ability to manipulate the heat gradient. Also included in advantages over prior art methods are the facts that no consumables are required, there is no need for gases or fuel on board or during transportation and cleanliness—in that there are no combustion byproducts. The invention provides consistent heat through a wide range of ambient temperatures. Another advantage is that of use in different rail geometry, rail chemistries and welding methods. In addition to heating, an analogous plate or array can be used to control cooling after welding.

In the preferred and alternative embodiments, the invention envisions the use of independent, single or multiple coils and/or power units. Independent, single or multiple coils and/or power units enable the precise location of heating, subdivides locations of heating and provides flexibility in the control of heating areas. An added benefit of using an independent preheating unit, as compared to including the welder or portions of the welder's power supply or the like is that of efficiencies gains due to multi tasking during welding process. While preheating is occurring, the welder itself can be independently set up for welding operations, or, indeed, one rail may be welded while the adjacent rail is preheated, should the rail gaps be proximate the rail welder's cable runs.

DESCRIPTION OF RELATED ART

While preheating of metal pieces for welding as a general concept is well known, heretofore generally manual application of heat has been used. The use of items such as gas or other torches, gas burners or electrically powered devices. Field welding in the past commonly preheated with torches and gas burners. Such methods introduce human intervention positioning, timing or estimating heat input and temperature. Combustion variables including fuel, air, pressure, position and shape of a flame relative to rails, ignition steps, initial temperature of the workpieces and even weather contribute to imprecision in temperature control in the prior art. Resistance electrical devices have power and conductivity variables including both electrical and thermal limitations that also contribute to imprecision in temperature control.

DETAILED DESCRIPTION OF THE INVENTION

Weld quality and consistency can be improved with precise control of heating (temperatures, location zones and heat gradients). Heating becomes more critical when dealing with certain alloying, geometry or ambient temperatures. This is more of an art gained through experience or a routine that must be followed carefully to attempt to produce consistent, quality welds.

Figure 2:
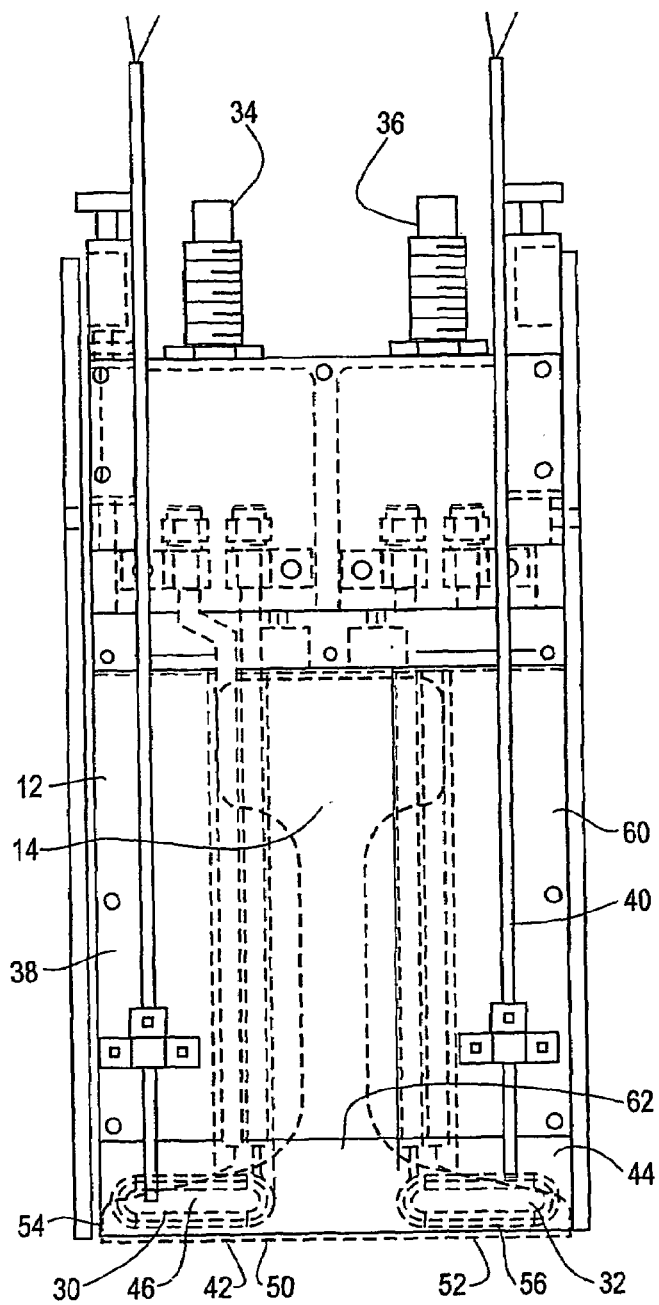
FIG. 2 is an elevational view showing the induction plate of the invention.
Figure 2A:
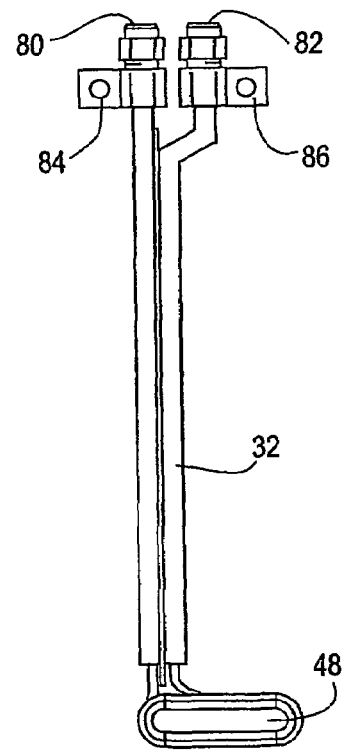
FIG. 2A is an elevational view showing an induction coil with ferrite core.
Figure 3:
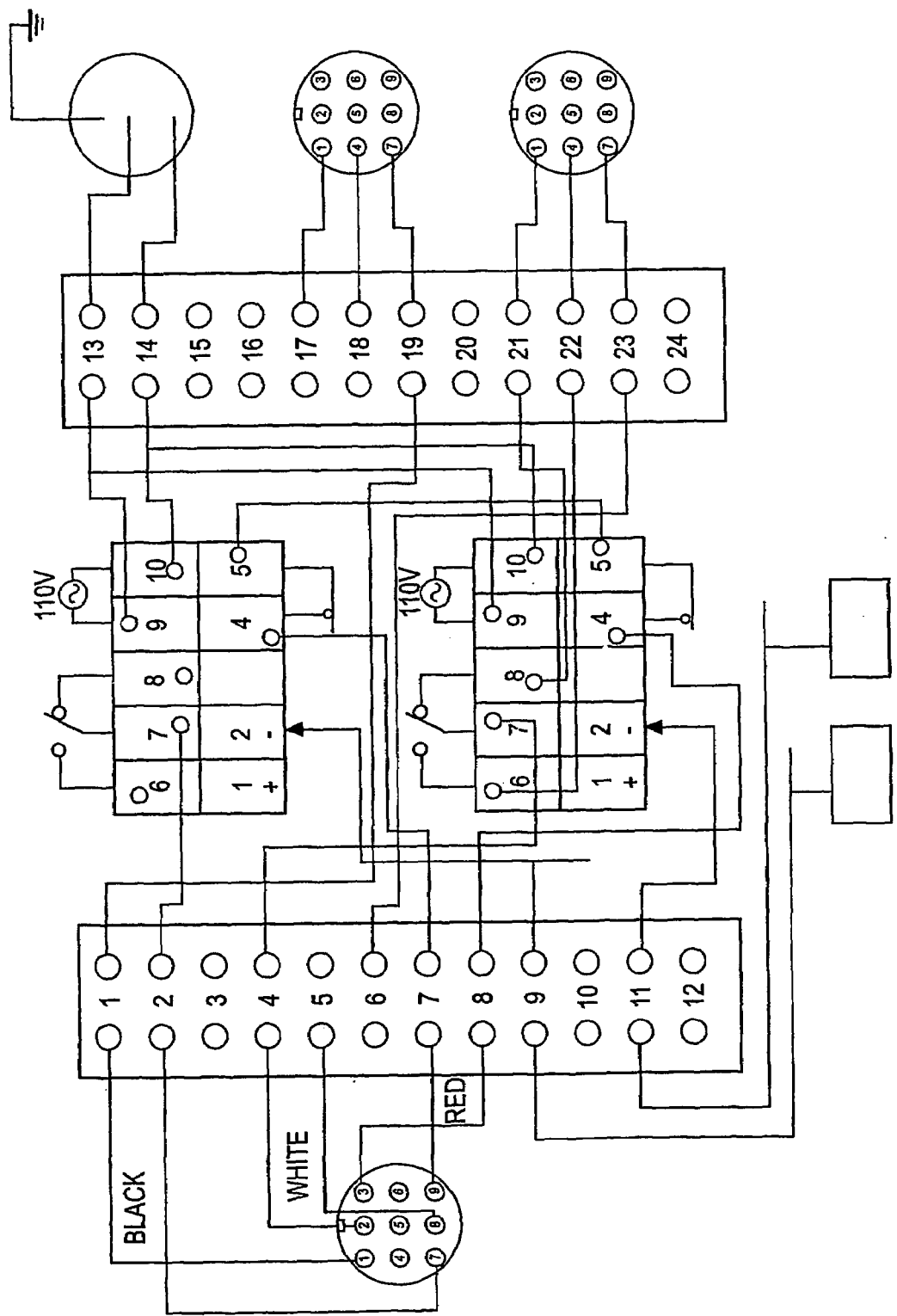
FIG. 3 is a wiring diagram showing the control wiring of the invention.

An induction heating system 10 uses a tool or plate 12 to heat a railroad rail 14. Power control 16 is operatively connected to a pair of power supplies 18,20. Power supplies 18,20 are in turn operatively connected to a heat zone control unit 22 using control output connections 24, 26. Cables (not shown) interconnect power supplies 18,20 to plate 12, generally, and to heating elements 30, 32 specifically through connectors 34, 36. FIG. 2A shows the heating element 32 in more detail. Each element 30, 32 is generally broken out into a separate heating module 38, 40 using the elements 30, 32 and other features more fully described below to provide a unitary heating module 38, 40. The heating system 10 is a 5 Kw, 25 Khz induction heating system broken out in the form of two 2.5 Kw modules 38, 40. While this is the preferred capacity of the system, different welding operations could advantageously be accommodated through the use of a heating system with a different heating capacity. These are capable of independent heating of two heat zones, 42, 44. Each module 38, 40 is connected to a heating element 30, 32 with ferrite cores 46, 48 in a common housing in plate 12 capable of being inserted in an approximate one inch gap between rails 14. It will be understood that the rails 14 are shown in section and in the field there will be to rails 14 with a gap between them intended to be welded.

For preheating of normal section railroad rails 14 for gas shielded arc welding, the preferred heat zones 42, 44 consist of two heating locations 50, 52 generally near the bottom flanges 54, 56. The preferred embodiment will be further described below after general description of the field that requires induction preheating.

Gas shielded arc welding without the preheating taught by the invention in this application has been practiced under controlled laboratory and/or workshop conditions but is believed unsuitable for use in the field. One method used under controlled conditions is generally taught by U.S. Pat. Nos. 5,773,779 and 5,877,468, which are incorporated by reference as if fully set forth herein. It is believed that one reason the method described in these two patents is inoperative in field conditions is inadequate control of preheating. Delivery of gas shielded arc welding equipment and the alignment and restraint of railroad rails and the deployment of a weld containment unit for application of weld beads is taught in published International Application No. WO 99/31322 published 16 Dec. 1998 entitled "Mail Welding Apparatus Incorporating Rail Restraining Device, Weld Containment Device and Weld Delivery Unit." The teachings of this application are also incorporated by reference. It is believed that the apparatus and method taught herein are essential in effective practice of gas shielded arc welding of rails.

Additionally, other welding methods are believed to be capable of enhancement through the use of the invention taught here. Other weld methods, such as thermite, on site foundry and even certain flux-based arc welding may prove suitable for high strength welds of complex shapes with adequate and well controlled preheating.

While the preferred embodiment of induction heating for rail welding using gas shielded arc welding anticipates using two heating modules 38, 40, other uses could use fewer, more or differently arranged heating modules. Thus, for certain rail welding or joining methods it may prove advantageous to heat the entire rail section simultaneously. The invention is not limited to rail welding using two heating modules.

Figure 5:
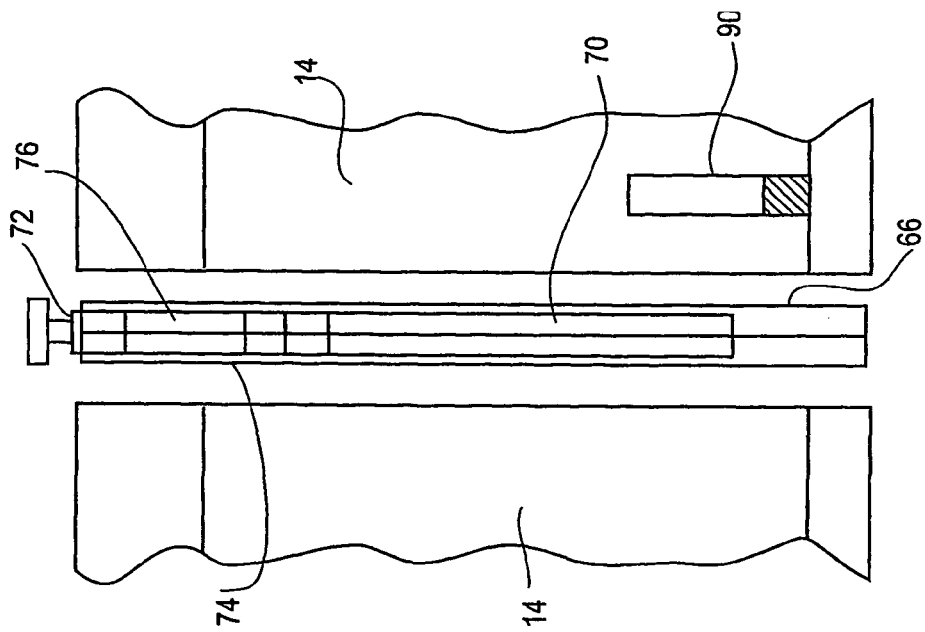
FIG. 5 is a side elevational view showing the induction plate of the invention.
Figure 4:
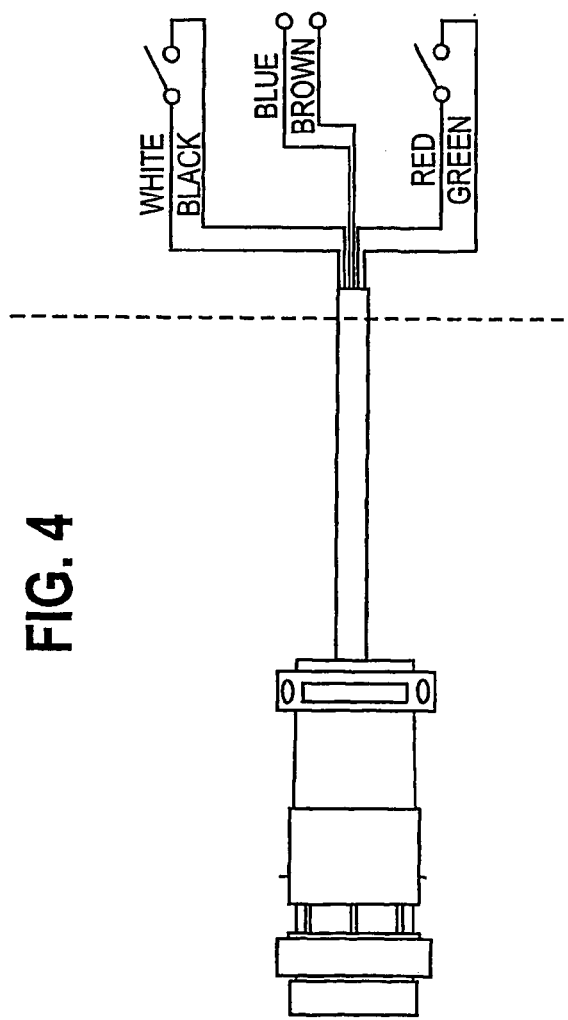
FIG. 4 is a wiring diagram showing the power supply wiring to control separate heating zones.

Plate 12 is formed to fully support and contain heating elements 30, 32. Accordingly plate 12 has a body portion 60 ending in a protective ceramic cover 62 which fully covers ferrite cores 46, 48 and the corresponding conductors of elements 30, 32. Side edges 64, 66 of plate 12 are fitted with centering bar assemblies 68, 70. Assemblies 68, 70 use centering adjustment mechanism 72 to adjust bars 74, 76 outwardly or inwardly to fit the rail gap. It will be understood that assemblies 68, 70 are symmetric and accordingly only one assembly 70 is shown and illustrated in FIG. 5.

Precise cutting of rails in the field is quite difficult, thus there is often variation in the size of gaps and the orientation of their faces. The adjustable and expandable centering bar assembles enabling side to side and top to bottom centering are important in aligning plate 12 as close to the center of the gap as practicable to maximize the uniform heating of the rail ends. In this manner the assemblies 68, 70 are aligned for maximum effectiveness and uniformity, being centered between faces that may themselves be non-parallel due to the difficulty of cutting in the field.

Each heating element 30, 32 is fitted with a respective pair of water/power connections 80, 82 illustrated in FIG. 2A. These enable both the electrical power connection necessary to energize the ferrite core 46, 48 and provide conduits for the transmission of cooling fluid to dissipate the heat radiantly transmitted from the preheated rails 14 to the plate 12. Spring clips 84, 86 are used to retain elements 30, 32 in place in plate 12.

Figure 1:
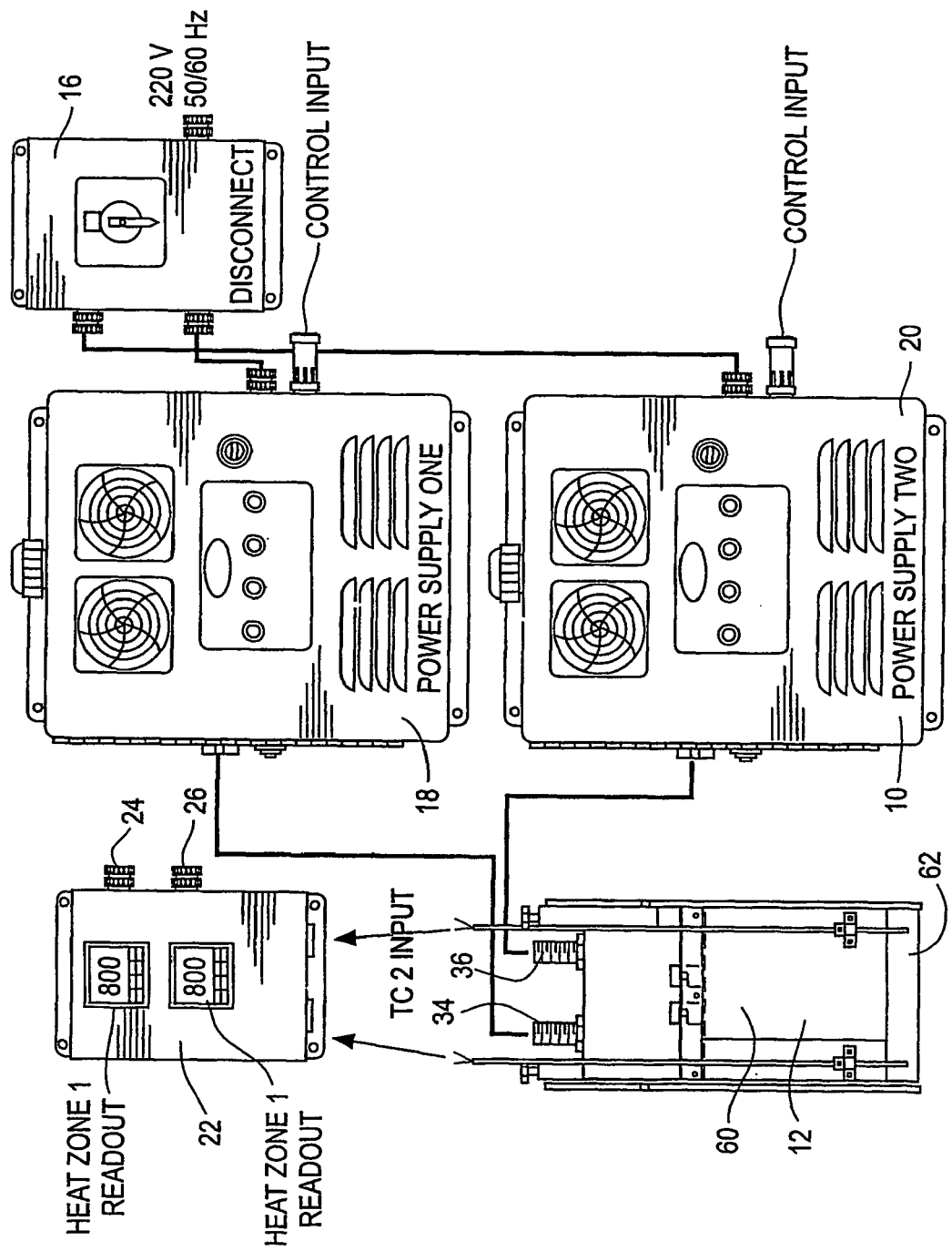
FIG. 1 is a schematic view showing the layout of the components of the invention.

Temperature measuring devices such as spring loaded thermocouples 90, 92 are used as an integral part of both plate 12 and heat zone control unit 22. Thermocouples 90, 92 are operatively connected to heat zone control unit 22 which is in turn used to control power supplies 18, 20. Power supplies 18, 20 receive signals from unit 22 interconnected through connections 24, 26 which provide power on or power off control signals depending on the heat measured at thermocouples 90, 92. It will be observed, particularly from FIGS. 1 and 2 that thermocouples 90 and 92 are positioned proximate ferrite cores 48, thereby providing an accurate temperature reading from rails 14 which are heated as a result of the energizing of elements 30, 32 and particularly cores 46, 48. The general principles of induction heating will be recognized, namely the providing of a sufficiently large energy output at elements 30, 32 and cores 46, 48 will create heat in adjacent steel rails 14.

In this manner heat zones 42, 44 are interactively controlled so that a controlled heat results although a variety of factors, whether an imprecise gap, power, magnetic fluctuations, unequal temperature differential or even environmental factors such as a crosswind, impact the actual temperature and heat distribution in the rails. As noted above while locating heat zones 42, 44 near the rail flanges is advantageous for gas shielded arc welding other types of welding may require the use of different heat zones such as heating the entire rail section including flanges, web and head, or for the welding of different shapes such as I-beams and the like. In these other uses and applications, the number of heat zones and their orientation can be controlled consistent with the principles of this invention. The use of one or more coil elements 30, 32 gives flexibility in applying the two preferred heat zones 46, 48. In other, particularly non-rail welding applications, a single heat zone or multiple heat zones could be used. A plurality of coil elements, two or more, also provide flexibility in temperature differentials that may be required by particular metallurgical or welding considerations.

The invention enables precision controlling of the heat gradient in the pieces to be welded. The interactive control between elements 30, 32 and thermocouples 90, 92 in zones 42, 44 enables the ability to manipulate the effects of applied heat to the particular metallurgy of the rails 14 and weld material and method used.

Control unit 22 can also be interconnected to corresponding additional fixtures or controls. The invention contemplates a feedback system that enables, but is not limited to input from a robot or positioner or a controller/computer that calculates heat soak/rail temperature for particular conditions. With this data compared to the induction heat inputs directly supplied by unit 22 and temperature measurement enabled by thermocouples 90, 92, control unit can be modified for particular time and energy parameters, given known metallurgical and welding requirements.

This full feedback system maximizes the quality control of the welding process so that it will be repeatable and monitored. The full feedback system also records actual temperatures and adjusts automatically. The fill feedback system is further programmable for various materials, conditions and methods. With greater and better data regarding when the weld pieces reach correct temperature(s) in singular and/or multiple zones fully integrated with weld delivery controls, the user is provided a seamless system with no additional mechanisms, components required, such as the prior art burners or torches, and welding materials requiring multiple unrelated and uncontrolled steps. Finally, the fully integrated system can be manipulated by robot for deployment, movements during heating process and retractment.

In operation, the steps of the invention are premised on the step in which each heat zone is monitored by a temperature measuring device which checks temperature on one side of the zone. Even heating is achieved on either side of the zone because the inductor is centered between the rails with a mechanical centering device, which independently and exactly centers the inductor relative to side one and side two. By so doing each side is brought up to a preferably preheat temperature even though the rails may have a variable gap. It will be noted that the temperature may, of course, vary based on the materials welded and the method of welding used.

Rail ends are preheated by induction heating for preparation of welding. The ideal temperature and heat gradient is controlled by a feedback system. The feedback system uses temperature-measuring devices like thermocouple's, pyrometers, and other heat sensors with or without a controlling device. During the pre-heating, different zone(s) of rail ends can be simultaneously heated independently of each other. Frequency, proximity and number of cycles allow for control of the heat gradient. This is complemented though coil designs in the tool and/or power inputs. This tool fits between the rail ends in the gap and can be manipulated by a robotic arm or manually. The gaps between rails are approximately ¼" and up. Material and mechanical designs of this tool enhance durability and efficiencies. Process requirements are monitored and recorded for quality control. Parameter measurements give a go/no go signal to proceed with welding or intervene with corrections to meet parameters. In addition post-heating enjoys many of the same benefits. The complete system is mobile and portable.

In operation, each zone begins heating simultaneously. Should one zone reach temperature prior to the other the heater output is reduced so as to maintain at temperature until the second zone also achieves required temperature. Only at this time does the controller send a signal to the weld controller indicating that welding can commence.

What is claimed is:

1. A self contained system for preheating and welding a gap in a railroad rail comprising:
   a weld delivery apparatus and power supply;
   a tool having first and second opposing sides, and disposed in a gap defined by first and second facing ends of the gap in the railroad rail, the tool further including mechanical centering assemblies disposed adjacent the facing ends of the gap in the railroad rail, wherein the mechanical centering assemblies position the tool longitudinally with respect to the railroad rails for proper proximity to the gap in the railroad rail;
   a first induction heating element affixed to the first side of the tool and disposed proximate the first and second railroad rails;
   a first heating zone defined by a first temperature sensor positioned proximate the first end of the gap in the railroad rail and the first heating element;
   a second induction heating element affixed to the second side of the tool and disposed proximate the first and second ends;
   a second heating zone defined by a second temperature sensor positioned proximate the second end of the gap in the railroad rail and the second heating element;
   a controller coupled to the first and second temperature sensors, the controller activating the first and second heating elements independently to achieve a preheating welding temperature in both first and second heating zones, said preheating temperature being controlled to be less than the melting point of the rail; and
   welding means for welding the railroad rails by filling the gap with weld material;
   said welding means comprising arc welding in which the energy used in welding can be sensed thereby providing feedback to said controller;
   said controller using said feedback to adjust said first temperature and said second temperature;
   said power supply providing energy for continuous operation of said first and second heating elements and welding means.

2. The system of claim 1, further comprising a first power supply coupled to the first heating element, and a second power supply coupled to the second heating element, wherein both first and second power supplies are coupled to the controller.

3. The system of claim 1, wherein the first and second induction heating elements are ferrite core heating elements.

4. The system of claim 1, wherein the temperature sensors comprise thermocouple temperature sensors.

5. The system of claim 1, wherein the temperature sensors comprise pyrometer temperature sensors.

6. The system of claim 1, wherein the controller provides a discernible indication when the railroad rails have reached the preheating welding temperature.

7. The system of claim 6, wherein the discernible indication is a visual indication.

8. The system of claim 1, wherein the controller provides positioning information to a positioning robot that adjusts relative position of the tool until the preheating temperature is achieved.

9. The system of claim 1, wherein cooling fluid is provided proximate each of the heating elements.

10. The system of claim 9, wherein the controller controls cooling fluid activation.

11. The system of claim 1, wherein there are three or more heating elements.

12. The system of claim 1, wherein there are three or more heating zones.

13. A system for preheating and welding first and second railroad rails to be welded together comprising:
   a tool disposed in a gap defined by facing ends of the railroad rails, the tool further including mechanical centering assemblies disposed adjacent the facing ends of the railroad rails, wherein the mechanical centering assemblies position the tool longitudinally with respect to the railroad rails for proper proximity to the railroad rails;
   an induction heating element affixed to the tool and disposed proximate the first and second railroad rails;
   a heating zone defined by a temperature sensor positioned proximate the first railroad rail and the heating element;
   a controller coupled to the temperature sensor, the controller activating the heating element to achieve a preheating welding temperature in the heating zone; and
   at least one of an arc welding means or thermite welding means for welding the railroad rails by filling the gap between the railroad rails with weld material;

said controller working in conjunction with feedback transmitted between said temperature sensor and said at least one of the arc welding means and the thermite welding means.

14. A system for preheating and welding first and second railroad rails to be welded together comprising:
   a tool disposed in a gap defined by facing ends of the railroad rails, the tool further including mechanical centering assemblies disposed adjacent the facing ends of the railroad rails, wherein the mechanical centering assemblies position the tool longitudinally with respect to the railroad rails for proper proximity to the railroad rails;
   a plurality of induction heating elements affixed to the tool and disposed proximate the first and second railroad rails;
   as plurality of heating zones defined by multiple temperature sensors positioned proximate the first railroad rail and the heating elements;
   a controller coupled to the temperature sensors, the controller activating the heating elements to achieve a preheating welding temperature in the heating zones; and
   a welder providing weld material filling the gap between the railroad rails;
   said preheating welding temperature being below the melting point of said rails;
   said controller processing feedback between said sensors and welder.

15. A system for preheating and welding first and second railroad rails to be welded together comprising:
   mounting means having first and second opposing sides, and disposed in a gap defined by facing ends of the railroad rails, wherein the mounting means further includes mechanical centering assemblies disposed adjacent the facing ends of the railroad rails, wherein the mechanical centering assemblies position the mounting means longitudinally with respect to the railroad rails for proper proximity to the railroad rails;
   a first induction heating means affixed to the first side of the mounting means and disposed proximate the first and second railroad rails;
   a first heating zone defined by a first temperature sensing means positioned proximate the first railroad rail and the first heating means;
   a second induction heating means affixed to the second side of the mounting means and disposed proximate the first and second railroad rails;
   a second heating zone defined by a second temperature sensing means positioned proximate the first railroad rail and the second heating means;
   a controller means coupled to the first and second temperature sensing means, the controller means activating the first and second heating means independently to achieve a preheating welding temperature in both first and second heating zones; and
   a welder providing weld material filling the gap between the railroad rails to weld the rails;
   said welder and heating means being transported and powered by a self contained vehicle;
   said heating means being controlled by said controller means in conjunction with the operation of said welder.

16. The system of claim 15, wherein the mounting means comprises a tool having first and second opposing sides.

17. The system of claim 15, further comprising a first power supply means coupled to the first heating means, and a second power supply means coupled to the second heating means, wherein both first and second power supplies means are coupled to the controller means.

18. The system of claim 15, wherein the first and second induction heating means comprise ferrite core heating elements.

19. The system of claim 15, wherein the temperature sensing means comprise thermocouple temperature sensors.

20. The system of claim 15, wherein the temperature sensing means comprise pyrometer temperature sensors.

21. The system of claim 15, wherein the controller means provides a discernible indication when the workpieces have reached the preheating temperature.

22. The system of claim 21, wherein the discernible indication is a visual indication.

23. The system of claim 15, wherein the controller means provides positioning information to a positioning means that adjusts relative position of the tool until the preheating temperature is achieved.

24. The system of claim 15, wherein cooling fluid is provided proximate each of the heating means.

25. The system of claim 24, wherein the controller means controls cooling fluid activation.

26. The system of claim 15, wherein there are three or more heating means.

27. The system of claim 15, wherein there are three or more heating zones.

28. A method for preheating and welding a railroad rail, the method comprising the steps of:
   (a) disposing, within a gap defined by first and second faces of at least a portion of a railroad rails, mounting means having first and second opposing sides;
   (b) providing mechanical centering assemblies disposed adjacent the first and second faces, wherein the mechanical centering assemblies position the mounting means longitudinally with respect to the railroad rails for proper proximity to the gap;
   (c) disposing a first induction heating means affixed to the first side of the mounting means proximate the first face;
   (d) defining a first heating zone by positioning a first temperature sensing means proximate the first face and the first heating means;
   (e) disposing a second induction heating means affixed to the second side of the mounting means proximate the first and second faces;
   (f) defining a second heating zone by positioning a second temperature sensing means proximate the second face and the second heating means;
   (g) activating the first and second heating means independently to achieve a predetermined preheat temperature in both first and second heating zones; and
   (h) welding the railroad rails by applying non-induction welding heat to the weld area;
   (i) providing weld material filling the gap between the faces to weld the rail;
   (j) providing power for both said non-induction welding heat and said first and second heating means being transported and powered by a self contained vehicle;
   (k) controlling said first and second heating means in conjunction with the operation of said non-induction welding heat.

29. The method of claim 28, wherein welding is by one of arc welding or thermite welding.

30. The method of claim 28, wherein the rails remain spaced during the step of activating to achieve a preheat temperature.

31. The method of claim 28, wherein the gap is filled during the welding step.

* * * * *